United States Patent [19]
Knight et al.

[11] 3,973,629
[45] *Aug. 10, 1976

[54] INJECTION PROFILES WITH RADIATION INDUCED COPOLYMERS

[76] Inventors: Bruce L. Knight, 713 Hawthorne, Findlay, Ohio 45840; John S. Rhudy, 6642 S. Ogdin, Littleton, Colo. 80121; William B. Gogarty, 7643 S. Race St., Littleton, Colo. 80122

[ * ] Notice: The portion of the term of this patent subsequent to Mar. 25, 1992, has been disclaimed.

[22] Filed: Nov. 6, 1972

[21] Appl. No.: 303,743

[52] U.S. Cl. .............................. 166/295; 166/247
[51] Int. Cl.² ..................... E21B 33/13; E21B 43/00
[58] Field of Search ............ 166/275, 294, 295, 247

[56] References Cited
UNITED STATES PATENTS

| | | | |
|---|---|---|---|
| 2,729,557 | 1/1956 | Booth et al. | 210/58 |
| 2,909,508 | 10/1959 | Jones | 260/79.3 |
| 3,114,419 | 12/1963 | Perry et al. | 166295/ |
| 3,152,641 | 10/1964 | Boyd | 166/295 |
| 3,302,717 | 2/1967 | West et al. | 166/295 |
| 3,336,979 | 8/1967 | Ingraham et al. | 166/294 |
| 3,400,761 | 9/1968 | Latimer et al. | 166/305 R |
| 3,493,529 | 2/1970 | Krottinger et al. | 166/295 |
| 3,502,149 | 3/1970 | Pence | 166/295 |
| 3,679,000 | 7/1972 | Kaufman | 166/275 |
| 3,749,172 | 7/1973 | Hessert et al. | 166/275 |

*Primary Examiner*—Ernest R. Purser
*Assistant Examiner*—Jack E. Ebel
*Attorney, Agent, or Firm*—Joseph C. Herring; Jack L. Hummel

[57] ABSTRACT

The injectivity profile of a heterogeneous formation and/or vertical conformance is improved by injecting an aqueous solution into the formation, the solution containing a polymer obtained as a product of radiation-induced polymerizatin of acrylamide and/or methacrylamide and acrylic acid, methacrylic acid, and/or alkali metal salts thereof. The polymerization is preferably carried out in a 10–60% aqueous solution with gamma radiation; the aqueous monomer solution preferably contains 25–99% acrylamide and 1–75% sodium acrylate. Immiscible, miscible, or miscible-like displacing processes can be used in conjunction with this invention.

20 Claims, No Drawings

INJECTION PROFILES WITH RADIATION INDUCED COPOLYMERS

CROSS REFERENCE TO RELATED APPLICATIONS

The following patent applications relate to the general field of this invention:
Ser. No. 303,735, filed Nov. 6, 1972;
Ser. No. 303,737, filed Nov. 6, 1972;
Ser. No. 307,713, filed Nov. 17, 1972;
Ser. No. 303,744, filed Nov. 6, 1972;
and application titled "Process for Recovering Hydrocarbon using Polymer Obtained by Radiation Polymerization," filed Nov. 6, 1972.

BACKGROUND OF THE INVENTION

1. Field of the Invention

Injectivity profile and vertical conformance of subterranean reservoirs are improved by injecting through an injection means in fluid communication with the reservoir an aqueous solution containing a copolymer obtained by radiation polymerization. Reservoirs especially useful with this invention are those defined as heterogeneous reservoirs or highly stratified reservoirs or reservoirs containing zones having substantially different permeabilities.

2. Description of the Prior Art

It is known that heterogeneous formation zones can "thieve" fluids during secondary or tertiary recovery processes. Such thieving zones generally effect premature fingering during the flooding process. Also, zones of lesser permeabilities are generally by-passed by displacing fluids, thus making a secondary or tertiary flooding process less efficient to displace the oil therefrom.

The prior art has tried to overcome this adversity by plugging the thieving zone. For example, cement, plastics, coal tar products and by-products, cotton seed hulls, etc. have been pumped into the thieving zones. The following patents are representative of the prior art:

U.S. Pat. No. 3,334,689 to McLauthlin stabilizes soil and substrata by consolidating loose sands, grouting, and bridging and plugging openings to render them less permeable to the passage of fluids. Such is accomplished by injecting an aqueous solution of a polymerizable composition containing a monoethylenically unsaturated acrylate monomer and a cross-linking agent.

Fulford, in U.S. Pat. No. 3,621,914, plugs fractures or highly permeable streaks in reservoirs containing kaolinite by introducing an aqueous solution containing hydrazine. The hydrazine attacks the kaolinite and decomposes the clay mineral bonds of the rock matrix.

Scott, Jr. et al, in U.S. Pat. No. 2,734,861, bridge permeable zones in a subterranean strata by injecting a polycyclic aromatic hydrocarbon having a freezing point above 100°F.

Parks, in U.S. Pat. No. 3,583,169, reduces the permeability of porous strata by reacting a basic solution having dispersed therein an organic compound (e.g., lignin or tannin acid) which will form a precipitate when contacted with an acidic solution containing multivalent metallic cations. The reaction product is formed in situ and reduces the permeability of the porous rock.

Eilers, in U.S. Pat. No. 3,421,584, and Pence, Jr., in U.S. Pat. No. 3,502,149, teach the use of polymers in subterranean strata.

SUMMARY OF THE INVENTION

Applicants have discovered that improved injectivity profiles and/or vertical conformance can be obtained by injecting into the formation an aqueous solution containing a copolymer obtained by radiation polymerization of acrylamide and sodium acrylate or like ethylenically unsaturated monomers. These copolymers are useful to temporarily or permanently plug or reduce the permeability of the pores of reservoir rocks. The aqueous polymer solution can be used in conjunction with secondary and tertiary recovery processes to improve oil recovery efficiency.

PREFERRED EMBODIMENTS OF THE INVENTION

The monomer is a combination of at least one compound selected from the group consisting of acrylamide and methacrylamide and at least one compound selected from the group consisting of acrylic acid, methacrylic acid, alkali metal acrylate, and alkali metal methacrylate. Minor amounts of additional ethylenically unsaturated, copolymerizable monomers may also be used. Preferably, the monomer is a mixture of acrylamide and sodium acrylate. It is preferred that the monomer contain about 1–75% and preferably 15–55% and more prefrably 25–50% of acrylic acid or alkali metal salt thereof, e.g., sodium acrylate.

Irradiation of the monomer is preferably carried out in an aqueous solution containing about 10% to about 60% and more preferably about 15% to about 45% by weight of dissolved monomer. At the lower concentrations of monomer, the product is generally a pourable polymer solution; at concentrations above about 15% by weight, the product is generally a nonpourable gel. A water-insoluble product may result at concentrations above about 60% monomer; thus, such high concentrations are undesirable. Of course, the particular limits of monomer concentration will depend, among other things, on the radiation conditions used, monomers used, and on the desired product for a particular use. The intrinsic viscosity of the polymer product increases as the monomer concentration increases, up to the point where the amount of cross-linking becomes appreciable, provided all other variables are kept constant.

The aqueous monomer solution preferably contains not more than about 5 ppm of transition metal ions, such as nickel, iron, and cobalt, and no more than about 0.5 ppm of cuprous and cupric ions.

Irradiation of the aqueous monomer solution may be accomplished with high energy ionizing radiation. Radiation wavelengths below 3500 Angstroms and preferably below 2000 Angstroms are useful. The radiation employed may be particulate or electromagnetic in nature. Examples include accelerated electrons, protons, neutrons, etc., as well as X-rays and gamma-rays, the latter being preferred.

Radiation intensity is preferably about 1,000 to about 300,000 rads/hr. and more preferably about 5,000 to about 200,000 rads/hr. Intensity directly influences the molecular weight of the copolymer. That is, under otherwise identical conditions, low intensities generally give higher molecular weights.

The radiation dose is preferably at least about 1,000 rads and more preferably at least about 1,500 rads. The maximum dose level is preferably not more than 100,000 rads and more preferably not more than 50,000 rads.

The radiation dose directly influences the intrinsic viscosity and degree of monomer-to-polymer conversion. At a given radiation intensity and monomer concentration, an increase in radiation dose generally tends to result in a decrease in the intrinsic viscosity of the polymer produced and an increase in the degree of monomer-to-polymer conversion. The radiation dose may also influence the water-solubility of the polymer, as it has been found that too high a radiation dose may render the resulting polymer water-insoluble. At the preferred dosage rates, conversion up to about 100% and preferably 80–100% of the monomer to polymer may be obtained without undue insolubilization.

The pH of the aqueous monomer solution is generally not critical except that very low pH values may cause insoluble products to form. Preferably the pH is within the range of 3–13 and more preferably about 8 to about 11. Although higher and lower pH values may be used, it should be recognized that hydrolysis tends to occur at pH values much below about 3 and much above about 11.

While the process described above may be used to prepare polymers having an intrinsic viscosity from about 6 to about 30 dl/g (deciliters per gram) in 2 normal sodium chloride at 25.5°C, the process is modified somewhat to prepare polymers having an intrinsic viscosity below about 6 dl/g or above about 30 dl/g in 2 normal sodium chloride at 25.5°C. Polymers having an intrinsic viscosity below about 6 dl/g are prepared by carrying out the polymerization reaction described above in the presence of a chain transfer agent. The chain transfer agent tends to restrict the growth of active polymer chains and thereby results in the formation of polymers having lower molecular weight (lower intrinsic viscosity). The chain transfer agents which may be used herein are any chain transfer agents which tend to restrict the growth of the polymer chains and thereby aid the formation of lower molecular weight (lower intrinsic viscosity) polymers and which are soluble in the reaction medium. Illustrative examples of chain transfer agents which may be used include lower alkyl alcohols, such as methanol, ethanol, and isopropanol; halogenated compounds, such as trichloroacetic acid; thiosorbitols containing two thio groups and four secondary hydroxyl groups; and mercaptans. The amount of chain transfer agent used depends upon the intrinsic viscosity desired, the monomer concentration, and the chain transfer constant of the chain transfer agent used. The use of a chain transfer agent is not necessary in order to prepare polymers having intrinsic viscosities from about 6 to about 30 dl/g; but if desired, such polymers may be prepared in the presence of chain transfer agents.

In order to prepare polymers having an intrinsic viscosity above about 30 dl/g, the polymerization reaction is terminated when less than about 75% and preferably when less than about 60% by weight of the monomer has been converted to polymer. It has been found that the intrinsic viscosity of the resulting polymer tends to decrease as the percent of conversion of monomer to polymer increases. For reasons of economy, it is not practical to have conversions lower than about 20%.

More specifically, to prepare polymers having intrinsic viscosities from about 30 to about 60 dl/g, it is preferred that the radiation intensity be below about 50,000 rads/hr and the monomer concentration of the aqueous medium to be irradiated be about 20 to about 60% and that the conversion of the monomer to the polymer be about 30 to about 70%, and more preferably less than 50%.

Where it is desired that the polymers have the highest molecular weight and the lowest Huggins constant, the reaction conditions should be such that the total radiation dose and conversion be low, the monomer concentration be relatively high, and the radiation intensity be relatively low—these preferred parameters being within the range of reaction conditions taught herein.

Where it is desired to obtain a less water-soluble polymer, the polymer can be branched or partially crosslinked. Such can be accomplished by overirradiating, e.g., by continuing the irradiation after all the monomer has been converted to polymer, or continuing the irradiation after insoluble polymer begins to appear. Also, cross-linking can be effected by using ethylenically unsaturated water-soluble copolymerizable monomers containing more than one ethylenically unsaturated bond. Examples of such monomers include methylene bisacrylamide, polyacrylates like sorbitol polyacrylate and polyallyl ethers of sorbitol like hexallyl sorbitol and like monomers. Where these monomers are used in the radiation polymerization process, they are preferably present in concentrations of about 0.01 to about 10% and preferably 0.05 to about 5% and more preferably 0.1 to about 3%, by weight.

The variables of radiation intensity, total radiation dose, and monomer concentration discussed above are interdependent variables. While useful polymers may be prepared at all monomer concentrations, radiation intensities, and radiation dosages within the ranges given heretofore, all combinations of concentration, dose, and intensity within these ranges may not be used to prepare polymers useful in the process of this invention. For example, while a polymer useful in the process of this invention may be prepared at a monomer concentration of 60% by weight, provided the radiation dose used is sufficiently low to result in the formation of water-soluble polymers, the use of a monomer centration of 60% by weight, an intensity of 250 rads per hour, and a dose of 300,000 rads, results in the formation of water-insoluble polymers. In view of this interdependency of intensity, dose, and monomer concentration, it may be necessary to perform a limited amount of experimentation in order to prepare a polymer having the desired intrinsic viscosity. However, this experimentation may be kept to a minimum in view of the disclosure in Table 1 below of the preparation of a variety of polymers of different viscosities and in view of the discussion above on the effect of intensity, dose, monomer concentration, degree of conversion, and chain transfer agent on the intrinsic viscosity of the polymer. Accordingly, the reaction conditions which may be used to prepare a water-soluble polymer having an intrinsic viscosity different from the intrinsic viscosities of the polymers described in Table I may be readily determined by minor modification of the reaction conditions given in Table 1 for the preparation of the polymer having the intrinsic viscosity nearest to the intrinsic viscosity of the polymer which is desired to be prepared. Such modification may be made in view of the discussions above on the effect of intensity, dose, monomer concentration, percent conversion of monomer to polymer, and chain transfer agent on the intrinsic viscosity of the polymer. For example, a polymer having an intrinsic viscosity of about 16 dl/g may be prepared by using the same reaction conditions employed in Example F, Table 1, except that the radiation intensity is increased, the total radiation dose is increased, the monomer concentration is lowered, the percent monomer conversion is increased, and/or the reaction is carried out in the presence of a chain transfer agent. It is generally preferred, however, that the said decrease in intrinsic viscosity be obtained by increasing the radiation intensity, lowering the monomer concentration, and/or using a chain transfer agent.

The product of irradiation is an aqueous solution of the water-soluble polymer which may be in the form of a pourable liquid or a nonpourable, rubbery gel, depending upon the polymer concentration and intrinsic viscosity of the polymer. The viscosity of the polymer solution tends to increase as the polymer concentration and intrinsic viscosity of the polymer increases. The polymer solutions produced by the radiation may be admixed with water and used directly or the polymer solution may be concentrated by conventional means or it may be recovered in particulate form, i.e., dry form. For example, a nonpourable gel may be finely subdivided and the water removed from the subdivided gel with a water-miscible, volatile organic liquid, e.g., with methanol, which has no affinity for the copolymer.

The polymers obtained from this radiation polymerization have relatively low Huggins constants. This constant is related to the linearity of the polymer where molecular weights are constant, i.e., for two copolymers having similar molecular weights, but different Huggins constant, the lower Huggins constant indicates a more linear polymer. Polymers having Huggins constants below 1 and preferably below 0.7 and more preferably below 0.5 are most often used with this invention. In certain applications, a mixture of polymers having low and high or low, medium, and high Huggins constants may be desired. A more detailed definition of Huggins constant and method for determining Huggins constant of a polymer is found in "Textbook of Polymer Chemistry," Billmeyer, Interscience Publishers, New York, 1957, pp 128–139.

The copolymer may "plug" or substantially reduce the permeability of the reservoir rock, either by adsorption, absorption, entrapment, or by reaction with formation fluids. Linear polymers having high intrinsic viscosities as well as branched polymers and partially cross-linked polymers are especially useful to accomplish this objective.

Intrinsic viscosity of the polymer can vary from less than about 1 to about 60 dl/g and preferably is about 5 to about 35 dl/g. The permeability of the reservoir rock to be treated will greatly influence the desired intrinsic viscosity, but, generally speaking, a lower permeability reservoir rock demands lower intrinsic viscosities. For example, permeabilities less than about 50 md will generally demand intrinsic viscosities less than about 10, whereas permeabilities of about 200 md or more will generally demand intrinsic viscosities up to and greater than 20. The intrinsic viscosity numbers referred to are measured in a 2 normal sodium chloride at 25.5°C. Of course, copolymers having very high intrinsic viscosities tend to "plug" or "bridge" pore holes in reservoir rock more effectively than lower intrinsic viscosities. It can generally be concluded that the effectiveness of the polymer increases as the intrinsic viscosity increases. Mixtures of two or more polymers having different intrinsic viscosities, Huggins constants, etc., may be used. Where the polymer is sequentially injected, each slug of polymer solution may contain different polymers, e.g., different intrinsic viscosities, Huggins constants, different degrees of branching and partial cross-linking, different concentration, etc.

The polymer may be solubilized and diluted to the desired concentration with water. The use of water containing large concentrations of polyvalent metallic cations which have an adverse effect on the viscosity of the polymer solution or on the water solubility of the polymer is preferably avoided. The concentration of polyvalent metal ions which may be present in the aqueous polymer solution is dependent upon the specific polyvalent metallic cation present, the temperature and pH of the solution, and the intrinsic viscosity and anionic content of the polymer. In general, the polymer becomes less tolerant of polyvalent metallic cations as the intrinsic viscosity, anionic content, and concentration of the polymer increase. The use of water containing substantial amounts of copper ions and/or iron ions is preferably avoided due to the adverse effect such ions may have on the water-solubility of the polymer, etc. Where maximum viscosity is desired for a given polymer concentration, the water preferably contains less than about 500 ppm of TDS (total dissolved solids). Also, where maximum viscosities are desired, the water preferably contains less than about 50 ppm of divalent cations, such as calcium and/or magnesium, i.e., the water is classified as "soft" water. Shearing of the polymer upon dissolution and injection into the reservoir should be avoided if maximum viscosity is desired. To obtain maximum viscosity with the gel form of the polymer, the gel is first extruded and then cut into fine pieces, e.g., the size of BBs, and thereafter agitated in an aqueous solution at low shear rates. Pumps characterized by low shear rates as well as agitators run at low shear rates are especially useful. Water-soluble alkaline salts, that is salts which give pH above 7 in water, such as alkali metal carbonates, may be added to the aqueous solution to facilitate solubilization of the polymer. A preferred alkaline salt is sodium carbonate. The amount of alkaline salts added to the water must be carefully controlled if one desires to avoid hydrolysis of the polymer. Other additives known to the art are also useful.

The plugging or reduction in permeability effect of the copolymer can be accomplished by numerous methods known in the art. For example, the aqueous copolymer solution can be injected as a separate slug to plug a thief zone in the reservoir. Also, the aqueous copolymer solution can be injected ahead of a miscible or immiscible or miscible-like displacement slug to improve the injectivity profile of a secondary or tertiary type recovery process. Such miscible and miscible-like displacement processes are known in the art. In addition, an aqueous polymer solution can be sequentially injected along with a miscible or miscible-like or immiscible displacing slug to improve the injectivity profile of a secondary or tertiary flooding process—e.g., the first injected aqueous polymer solution enters the most permeable stratum whereas the second and third aqueous polymer solutions enter lesser permeable zones. Packers, chokes in injecting strings, diverting agents, sealer balls, etc., can be used with this invention.

The aqueous polymer solution can contain additives to impart desired properties thereto. For example, the aqueous solution can contain corrosion inhibiting agents, biocides, oxygen scavengers, surfactants (e.g., to inhibit the formation of emulsions within the subterranean reservoir and to remove emulsion blocks), etc.

The volume amount of the aqueous polymer solution and the concentration of the polymer to be injected into the reservoir will depend upon the degree of "plugging" desired and also the heterogeneity of the reservoir rock. Formation pore volumes (i.e., the effective pore volume to be treated) of about 0.1 to about 70% and preferably about 1 to about 50% and more preferably about 5 to about 25% are generally sufficient to improve the injectivity profile or vertical conformance of most reservoirs. The pore volumes can be injected as one slug or as numerous slugs; however, the total volume injected will generally not be greater than the above pore volumes. The concentration of the polymer can range from about 10 to about 10,000 ppm or more and preferably about 50 to about 5,000 ppm and more preferably about 100 to about 1,000 ppm.

The polymers of this invention can be selected to exhibit very high viscosities at low shear rates—this property is useful to effect "plugging" or permeability reduction when the flow rate is slow, i.e., at low shear rates, through a stratum. These polymers also exhibit low viscosities at high shear rates; thus, an aqueous solution containing the polymer can be injected into a stratum with relatively low pressure drops.

Also, the polymers can be selected to have improved shear degradation characteristics. That is, polymers generally tend to degrade as they pass through high shear rate regions, e.g., through valves, pipe fittings, etc. By selecting a polymer with some degree of branching or some degree of cross-linking, the polymer will be less sensitive to shear degradation. Thus, for given molecular weight polymers, a polymer with a higher Huggins constant will be less sensitive to shear degradation.

Where injectivity profile of a well is to be improved, volume amounts of about 1 to about 500 and preferably about 5 to about 250 and more preferably about 25 to about 200 gallons per vertical foot of formation to be treated are useful. If it is desired to restore some of the permeability of the formation, aqueous solutions containing chemicals, e.g., hydrazine, sodium hypochlorite and like chemicals, to chemically degrade the polymer, can be injected into the treated formation.

Where vertical conformance of the formation is to be improved, the previously specified formation pore volumes are especially useful. Packers, chokes in injection strings, etc., can be used to inject the aqueous polymer solution into a particular strata. Also, it may be desired to inject different polymer solutions into different strata. In addition, chemical solutions to chemically degrade a polymer-treated stratum may be injected into that stratum to restore permeability.

Other synthetic or naturally occuring polymers can be incorporated within the aqueous polymer solution of this invention to enhance the plugging efficiency.

The following examples are presented to teach specific working embodiments of the invention; such are not meant to limit the interpretation of the invention. Unless otherwise specified, all percents are based on volume.

Preparation of the Copolymers

Polymers used for testing are prepared with Cobalt 60 gamma radiation; radiation intensities and dosages are outlined in Table 1. The process for preparing Polymer A is explained; preparation of the other polymers is similar except for variations indicated in Table 1.

To 24,000 gms of deionized water there are added 692 gms of sodium hydroxide. After cooling the solution to 30°C, 1,250 gms of acrylic acid are added. Thereafter, 5,000 gms of acrylamide are added while mixing, and the pH is adjusted to 9.4. The resulting solution contains 75% by weight acrylamide (AAd) and 25% by weight sodium acrylate (NaAA) and has a total monomer concentration of 21.4% by weight. The solution is purged with $N_2$ for 20 minutes and thereafter sealed. The sample is irradiated with Cobalt 60 gamma radiation at an intensity of 18,000 rads/hr. (R/hr.) to a total dose of 8,800 rads (R). The resulting product is a gel-like mass.

A portion of the gel is weighed, and thereafter extracted with methanol to precipitate the polymer. The polymer is dried in a vacuum oven at 36°C and 0.02 psia for 24 hours and then to constant weight at 110°C. Weight of the dried product divided by the theoretical weight gives a monomer conversion of 93%.

A portion of the gel is solubilized in water by first extruding it through a "meat" grinder, the "spaghetti"-like extrusion is cut into 37 BB" size particles and then dissolved in water by agitating at a low rpm to prevent substantial shearing of the polymer.

The residue of the gel is produced in dry powder form by first extruding the gel, then dissolving it in water and thereafter adding methanol to precipitate the polymer out of the solution. The polymer is then ground to less than 20-mesh size and finally dried at 60°C in a vacuum oven.

The intrinsic viscosity is measured at 25.5°C in a 2 normal NaCl aqueous solution. The Huggins constant is measured by the method described in "Textbook of Polymer Chemistry," Billmeyer, Interscience Publishers, New York, 1957, pp. 128–139.

The monomer used in Sample "G" is dissolved in water containing 9.1% by weight of methanol.

TABLE 1

INFORMATION ON POLYMER SAMPLES

| Polymer | AAd/NaAA Wt. Ratio | Monomer Concentration (%) | pH | Intensity (R/hr.) | Total Dose (R) | Additive (%) | Monomer Conversion (%) | Intrinsic Viscosity Gel (dl/g) | Intrinsic Viscosity Powder (dl/g) | Huggins Constants Gel | Huggins Constants Powder |
|---|---|---|---|---|---|---|---|---|---|---|---|
| A | 75/25 | 21 | 9.4 | 18,000 | 8,800 | — | 93 | 23.7 | 23.0 | — | 0.19 |
| B | 70/30 | 21 | 9.4 | 20,000 | 9,800 | — | 93 | 22 | 20 | 0.19 | 0.19 |
| C | 60/40 | 22 | 9.4 | 20,000 | 10,300 | — | 93 | 23.0 | 23.0 | — | — |
| D | 70/30 | 30 | 9.5 | 230,000 | 50,000 | — | 91 | 14 | 12.8 | — | 0.38 |
| E | 70/30 | 40 | 9.5 | 10,000 | 1,760 | — | 34 | 39.4 | 33 | 0.06 | — |
| F | 70/30 | 24 | 9.5 | 100,000 | 15,000 | — | 86 | 18.5 | — | 0.24 | — |
| G | 70/30 | 27 | 9.5 | 20,000 | 11,500 | MeOH 9.1 | 91 | 12.4 | 11.7 | 0.31 | 0.38 |
| H | 70/30 | 13 | 9.5 | 220,000 | 44,000 | MeOH 15 | 96.5 | 1.0 | — | — | — |
| I | 70/30 | 13 | 9.5 | 220,000 | 44,000 | — | 96.5 | 5.8 | — | 0.64 | — |

TABLE 1-continued

INFORMATION ON POLYMER SAMPLES

| Polymer | AAd/NaAA Wt. Ratio | Monomer Concentration (%) | pH | Intensity (R/hr.) | Total Dose (R) | Additive (%) | Monomer Conversion (%) | Intrinsic Viscosity Gel (dl/g) | Intrinsic Viscosity Powder (dl/g) | Huggins Constants Gel | Huggins Constants Powder |
|---|---|---|---|---|---|---|---|---|---|---|---|
| J | 70/30 | 25 | 9.5 | 220,000 | 44,000 | MeOH 15 | 84.0 | 6.9 | — | 0.52 | — |
| K | 70/30 | 24 | 9.5 | 20,000 | 7,660 | — | 86.7 | 28.2 | — | 0.13 | — |
| L | 70/30 | 30 | 9.5 | 20,000 | 2,667 | — | 54 | 31.0 | — | 0.04 | — |
| M | 90/10 | 40 | 9.6 | 10,000 | 1,350 | — | 24 | 53 | — | Less than 0.02 | — |

EXAMPLE I

To show that the copolymers of this invention are effective to reduce the permeability of a porous medium, this example is presented. Also, this example compares the copolymers of this invention with commercially available polymers to show how it imparts improved permeability reduction.

Sandstone cores 1 inch in diameter by 3 inch long are first flooded with toluene to remove hydrocarbon therefrom and are then dried in a vacuum. Permeabilities of the core are within the range of about 150 to about 200 md. They are then encapsulated in plastic. The cores have pressure taps mounted along the linear axis of the core sample; the ends of the sample are open for fluid flow. The cores are first flooded with water containing 500 ppm of TDS and are thereafter flooded with the same water containing Table 2 indicated concentrations of polymer. The intrinsic viscosities are measured in distilled water containing 3% NaCl. The screen factors for the aqueous polymer solutions qualitatively indicate the tendency of the polymer to effect permeability reduction in a porous media; the screen factor is described in the publication: Jennings, R. R., J. H. Rogers and T. J. West, "Factors Influencing Mobility Control by Polymer Solutions," J. Pet. Tech., 23, 391–401 (March, 1971). The permeability reduction number indicates a relative value for reduction in permeability. Permeability reduction is defined as the permeability to water before polymer flooding divided by the permeability to water after polymer flooding. For example, a permeability reduction of 50 indicates that the initial permeability, before polymer flooding, has decreased 98% after polymer flooding. Table 2 indicates the results of the tests:

As the above table indicates, polymer E essentially completely plugs the sandstone core, whereas polymer B gives a permeability reduction at about four times as great as the commercially available, partially hydrolyzed polyacrylamide and copolymer No. 2. Polymer E in Table 1 at the same concentration and water conditions as copolymers No. 1 and No. 2, exhibits a Brookfield viscosity at 6 rpm of 52 cp.

It is not intended that the above examples limit this invention; rather, it is intended that obvious extensions of the invention known within the art be included within the scope of the invention as defined in the specification and appended claims.

What is claimed is:

1. A process of improving the injectivity profile and/or vertical conformance of a subterranean formation containing at least one highly permeable stratum, the process comprising injecting into the formation having an injection well in fluid communication with at least one production well and displacing therethrough an aqueous solution comprised of a copolymer obtained as a product of radiation polymerization of at least one monomer selected from the group consisting of acrylamide and methacrylamide and at least one monomer selected from the group consisting of acrylic acid, methacrylic acid, alkali metal acrylate, and alkali metal methacrylate in concentration of about 10% to about 60% by weight total dissolved monomer in an aqueous medium, the radiation intensity being about 250 to about 1,000,000 rads/hr. and the radiation dose being about 500 rads to about 300,000 rads, the polymer having sufficient property to reduce the permeability of the highly permeable stratum but permitting sufficient permeability to obtain displacement of at least a substantial portion of the aqueous solution through the formation to the production well.

2. The process of claim 1 wherein one of the monomers is acrylic acid.

3. The process of claim 1 wherein one of the monomers is methacrylic acid.

TABLE 2

| Polymer | Concentration of Polymer (ppm) | Brookfield* Viscosity at 6 rpm & 22°C (cp) | Screen* Factor | Intrinsic** Viscosity (dl/g) | Permeability* Reduction |
|---|---|---|---|---|---|
| E | 700 | 44 | 77 | 27.0 | "Infinite" |
| B | 700 | 32 | 25 | 21.6 | 56 |
| Partially hydrolyzed polyacrylamide | 700 | 20 | 24 | 15.1 | 15 |
| Copolymer No. 1 | 800 | 39 | 25 | 14.9 | 50 |
| Copolymer No. 2 | 800 | 38.5 | 29 | 22.0 | 17 |

*700 ppm polymer in 80% zeolite treated water (contains 500 ppm of TDS)
**in 3% NaCl brine
Copolymer No. 1 = a commercially available, anionic acrylamide copolymer obtained by a chemically catalyzed polymerization reaction; has a Huggins constant of 0.34.
Copolymer No. 2 = a commercially available, very high molecular weight, strongly anionic copolymer of acrylamide obtained by a chemically catalyzed polymerization reaction; has a Huggins constant of 0.18.
Partially hydrolyzed polyacrylamide = a commercially available, partially hydrolyzed, high molecular weight polyacrylamide obtained by a chemically catalyzed polymerization reaction; has a Huggins constant of 0.38.

4. The process of claim 1 wherein one of the monomers is sodium acrylate.

5. The process of claim 1 wherein one of the monomers is sodium methacrylate.

6. The process of claim 1 wherein one of the monomers is acrylamide.

7. The process of claim 1 wherein the polymer is a copolymer obtained by copolymerizing acrylamide and sodium acrylate.

8. The process of claim 1 wherein the radiation intensity is within the range of about 1,000 to about 300,000 rads/hr.

9. The process of claim 1 wherein the radiation dose is within the range of about 1,000 to about 100,000 rads.

10. The process of claim 1 wherein the aqueous medium is at a pH within the range of about 3 to about 13.

11. The process of claim 1 wherein the pH of the aqueous medium is within the range of about 8 to about 11.

12. The process of claim 1 wherein the injectivity profile of the subterranean formation is improved by injecting into the formation about 1 to about 500 gallons per vertical foot of the formation to be treated of the aqueous polymer solution.

13. The process of claim 1 wherein the aqueous polymer solution contains about 10 to about 10,000 ppm of the polymer.

14. The process of claim 1 wherein the vertical conformance of a formation is improved by injecting into the at least one highly permeable stratum about 0.1 to about 70% formation pore volume of the aqueous polymer solution.

15. A process of improving the injectivity profile of a subterranean reservoir characterized as having a "thieving" zone (s) therein, the process comprising injecting into the reservoir having an injection well in fluid communication with at least one production well sufficient amounts of an aqueous polymer solution to substantially reduce the permeability of the thieving zone but permitting sufficient permeability in the residue of the reservoir to obtain displacement of the aqueous polymer solution therethrough to the production well (s), the aqueous polymer solution comprised of a water-soluble copolymer obtained as a product of radiation polymerization of an aqueous solution comprised of about 10% to about 60% of a mixture of 25% to 99% acrylamide and about 75% to about 1% sodium acrylate, the radiation intensity being within the range of about 5,000 to about 200,000 rads/hr. and the radiation dose being within the range of about 1,500 rads to about 50,000 rads, the polymer having sufficient property to reduce the permeability of the reservoir rock within the thieving zone.

16. The process of claim 15 wherein the copolymer obtained from the radiation polymerization is in the form of a gel.

17. The process of claim 15 wherein the aqueous solution contains 15% to about 55% by weight of sodium acrylate.

18. The process of claim 15 wherein the radiation is gamma radiation.

19. A process of improving the vertical conformance of a subterranean formation under a secondary or tertiary oil recovery flooding process, the formation containing at least one highly permeable stratum and having an injection well in fluid communication with at least one production well, the process comprising injecting into the formation through the injection well and displacing therethrough about 0.1% to about 70% formation pore volumes of an aqueous polymer solution containing a water-soluble polymer obtained by radiation polymerization of at least one monomer selected from the group consisting of acrylamide and methacrylamide and at least one monomer selected from the group consisting of acrylic acid, methacrylic acid, alkali metal acrylate, and alkali metal methacrylate in concentrations of about 10% to about 60% by weight total dissolved monomer in an aqueous medium, the radiation intensity is about 250 to about 1,000,000 rads/hr. and the radiation dose is from about 500 rads to about 300,000 rads, the polymer having sufficient property to reduce the permeability of the highly permeable stratum but permitting sufficient permeability to obtain substantial displacement of the aqueous polymer solution through the formation to the production well (s).

20. The process of claim 19 wherein the polymer is a copolymer obtained by copolymerizing about 1 to about 75% of sodium acrylate and about 25 to about 99% of acrylamide, the percents based on the weight of the total monomer.

* * * * *

UNITED STATES PATENT OFFICE
CERTIFICATE OF CORRECTION

Patent No. 3,973,629          Dated August 10, 1976

Inventor(s) Bruce L. Knight, John S. Rhudy, William B. Gogarty

It is certified that error appears in the above-identified patent and that said Letters Patent are hereby corrected as shown below:

Abstract, line 6: delete "polymerizatin" and substitute therefor --polymerization--

Column 2, line 30: delete "prefrably" and substitute therefor --preferably--

Column 4, line 45 and 46: delete "cen-tration" and substitute therefor --concentration--

Column 8, line 40: delete "37 BB" and substitute therefor --"BB"--

Signed and Sealed this

Twenty-ninth Day of May 1979

[SEAL]

Attest:

RUTH C. MASON
Attesting Officer

DONALD W. BANNER
Commissioner of Patents and Trademarks